US007218385B2

(12) United States Patent
Takagi

(10) Patent No.: US 7,218,385 B2
(45) Date of Patent: May 15, 2007

(54) PRECEDING VEHICLE RECOGNITION APPARATUS

(75) Inventor: Kiyokazu Takagi, Okazaki (JP)

(73) Assignee: DENSO Corporation, Kariya (JP)

( * ) Notice: Subject to any disclaimer, the term of this patent is extended or adjusted under 35 U.S.C. 154(b) by 244 days.

(21) Appl. No.: 11/116,042

(22) Filed: Apr. 27, 2005

(65) Prior Publication Data

US 2005/0243301 A1    Nov. 3, 2005

(30) Foreign Application Priority Data

Apr. 28, 2004    (JP)    ............................. 2004-134421

(51) Int. Cl.
G01C 3/08 (2006.01)
(52) U.S. Cl. .................. 356/4.07; 356/4.01; 356/4.02; 356/4.1
(58) Field of Classification Search ................ 356/4.07
See application file for complete search history.

(56) References Cited

U.S. PATENT DOCUMENTS

| 6,122,040 | A | 9/2000 | Arita et al. |
| 6,618,126 | B2 * | 9/2003 | Shirai et al. .................. 356/5.1 |
| 6,810,330 | B2 | 10/2004 | Matsuura |
| 6,819,407 | B2 | 11/2004 | Arita et al. |
| 2004/0169840 | A1 | 9/2004 | Hoashi et al. |
| 2005/0243301 | A1 * | 11/2005 | Takagi ....................... 356/4.07 |

FOREIGN PATENT DOCUMENTS

| JP | 11/142520 | 5/1999 |
| JP | 2000-314774 | 11/2000 |
| JP | 2000-314775 | 11/2000 |
| JP | 2001-215274 | 8/2001 |
| JP | 2002-181936 | 6/2002 |
| JP | 2002-228734 | 8/2002 |
| JP | 2002-243857 | 8/2002 |
| JP | 2003-014844 | 1/2003 |
| JP | 2003-030792 | 1/2003 |
| JP | 2003-042757 | 2/2003 |
| JP | 2003-057339 | 2/2003 |
| JP | 2003-109171 | 4/2003 |
| JP | 2003-255047 | 9/2003 |

OTHER PUBLICATIONS

Office Action dated Dec. 21, 2006 for corresponding Japanese Application No. 2004-134421 and partial English translation thereof.

* cited by examiner

Primary Examiner—Thomas H. Tarcza
Assistant Examiner—Luke D. Ratcliffe
(74) Attorney, Agent, or Firm—Harness, Dickey & Pierce, PLC

(57) ABSTRACT

A preceding vehicle recognition apparatus detects positions of two reflectors provided on a preceding vehicle from individual received signals each representing a signal reflected by the reflectors. The apparatus further detects position of an area of rear face of the preceding vehicle by integrating a plurality of received signals each representing a signal reflected by the body of the preceding vehicle. Thus, even when only one of the two reflectors is detected or both reflectors cannot be detected, the width of the preceding vehicle can be found. By using the width of the preceding vehicle, it is possible to keep track of the movement of the same preceding vehicle with a high degree of reliability.

8 Claims, 9 Drawing Sheets

PRECEDING VEHICLE RECOGNITION APPARATUS

CROSS REFERENCE TO RELATED APPLICATION

This application is based on and incorporates herein by reference Japanese Patent Application No. 2004-134421 filed on Apr. 28, 2004.

FIELD OF THE INVENTION

The present invention relates to a preceding vehicle recognition apparatus for continuously recognizing a preceding vehicle while identifying the same.

BACKGROUND OF THE INVENTION

As a preceding vehicle recognition apparatus is proposed for a vehicle. The apparatus radiates a transmission signal such as a light or millimeter wave signal over a predetermined angular range in the forward direction of the vehicle and, by detection of a reflected signal obtained as a result of reflection of the transmission signal, recognizes a preceding vehicle existing at a location away from the vehicle in the forward direction. This preceding vehicle recognition apparatus can be applied to a variety of apparatuses mounted on a vehicle. Typical application includes a apparatus which generates a warning when the distance between the vehicle and a preceding vehicle becomes short, and a apparatus which controls the speed of the vehicle so as to maintain the inter-vehicle distance between the vehicle and a preceding vehicle.

Such a preceding vehicle recognition apparatus is disclosed in JP 2002-181936A. In this conventional preceding vehicle recognition apparatus, a scanning laser radar measures a distance between the vehicle and a beam-reflecting body existing in a detection area. In the measurement processing, the scanning laser radar carries out a grouping process to put portions determined to be portions of the same body in a group in order to find not only the distance between the vehicle and a beam-reflecting body, but also the azimuth and size of the body. In the grouping process, portions that are located at the same distance and move in the same direction continuously along the time axis are regarded as portions of the same body.

In particular, the preceding vehicle recognition apparatus selects a beam-reflecting body with a small width among detected bodies and determines whether or not there is a possibility that a portion of the selected body is concealed behind another body existing closer to the vehicle than the selected body. By determining such possibility, the preceding vehicle recognition apparatus is capable of determining whether or not a beam-reflecting body newly appears in front of the vehicle as the other body existing closer to the vehicle moves in the transversal direction of the movements.

In the case of an example shown in FIG. 14, it is assumed a first preceding vehicle 201 is traveling in front of a vehicle having a laser radar 200 and a second preceding vehicle 202 is traveling on the diagonally forward left side of the first preceding vehicle 201. In this case, the laser radar 200 is capable of measuring a distance to left and right reflectors 201L and 201R on the rear face of the first preceding vehicle 201 and a distance only to a left reflector 202L on the rear face of the second preceding vehicle 202. Since a right reflector 202R on the rear face of the second preceding vehicle 202 is located at a position concealed behind the first preceding vehicle 201 when viewed from the vehicle, the laser radar 200 is not capable of measuring a distance to the right reflector 202R on the rear face of the second preceding vehicle 202.

Thus, assuming that the second preceding vehicle 202 probably having its portion concealed and existing at a location farther from the vehicle 200 has a predetermined width, the conventional preceding vehicle recognition apparatus determines whether or not a portion of the second preceding vehicle 202 is concealed behind the first preceding vehicle 201 closer to the vehicle by determining whether or not the right edge of the second preceding vehicle 202 pertains to a projection area on the second preceding vehicle 202. The projection area is computed with coordinates of left and right edges of the first preceding vehicle 201 taken as a reference.

By making use of reflectors provided on the left and right edges of the rear face of a preceding vehicle, the conventional apparatus detects the positions of the left and right edges of the rear face of the preceding vehicle. Since the reflectors each have a high reflectance in comparison with the vehicle body itself, reflected signals each having a high intensity can be obtained from the reflectors. Thus, normally, the positions of the left and right edges of the rear face of a preceding vehicle can be detected with a high degree of precision based on received signals representing signals reflected by the reflectors. Then, by linking the detected positions of the left and right edges of the rear face as positions varying with the lapse of time to form movement vectors, the locus of the preceding vehicle can be found.

However, when the reflectors are dirty or the preceding vehicle is traveling along a curved road, for example, it is difficult to detect the reflectors in some cases. In such cases, the conventional apparatus is no longer capable of detecting the positions of the left and right edges on sides of the rear face of the preceding vehicle. Thus, the preceding vehicle is mistakenly put in the same group as another preceding vehicle traveling in parallel to the preceding vehicle. It is therefore difficult to keep track of the movement or the locus of the preceding vehicle with a high degree of reliability.

SUMMARY OF THE INVENTION

It is thus an object of the present invention addressing the above drawbacks to provide a preceding vehicle recognition apparatus capable of continuously recognizing a preceding vehicle while identifying the same even when reflected signals cannot be obtained from reflectors mounted on the preceding vehicle temporarily or continuously.

A preceding vehicle recognition apparatus according to the present invention computes the positions of reflectors mounted on a preceding vehicle based on received signals representing signals reflected by the reflectors and calculates the area of the rear face of a vehicle body composing the preceding vehicle from integrated received signals each obtained as a result of integrating a predetermined number of received signals.

The intensity of a signal reflected by the rear face of the body composing the preceding vehicle is low in comparison with those of signals reflected by the reflectors. By integrating a predetermined number of received signals, however, the intensity of each individual signal reflected by the rear face of the body of the preceding vehicle is considered amplified. Thus, by using the integrated received signal, the area of the rear face of the body composing the preceding vehicle can be calculated with a relatively high degree of precision.

It is to be noted that a plurality of received-signal integration groups each including received signals to be integrated to find an integrated received signal are set such that a preceding one of the received-signal integration groups is shifted to form a succeeding one of the received-signal integration groups by an interval corresponding to received signals fewer than a predetermined number of received signals composing each of the received-signal integration groups so that some received signals pertain to a plurality of adjacent preceding and succeeding received-signal integration groups. Thus, even though the received signals composing a received-signal integration group are integrated to give an integrated received signal, the resolution to detect a preceding vehicle can be maintained relatively high.

By using the integrated received signal, the preceding vehicle recognition apparatus is capable of calculating the area of the rear face of the vehicle body composing the preceding vehicle with a relatively high degree of precision. Thus, even when only one reflector of a preceding vehicle can be detected, that is, even when not all the reflectors can be detected, the width of the preceding vehicle can be found. As a result, since the number of times to compute the width of a preceding vehicle can be increased, it is possible to keep track of the movement of preceding vehicle by using measurement results of the width of the preceding vehicle so that the recognition of the preceding vehicle can be enhanced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
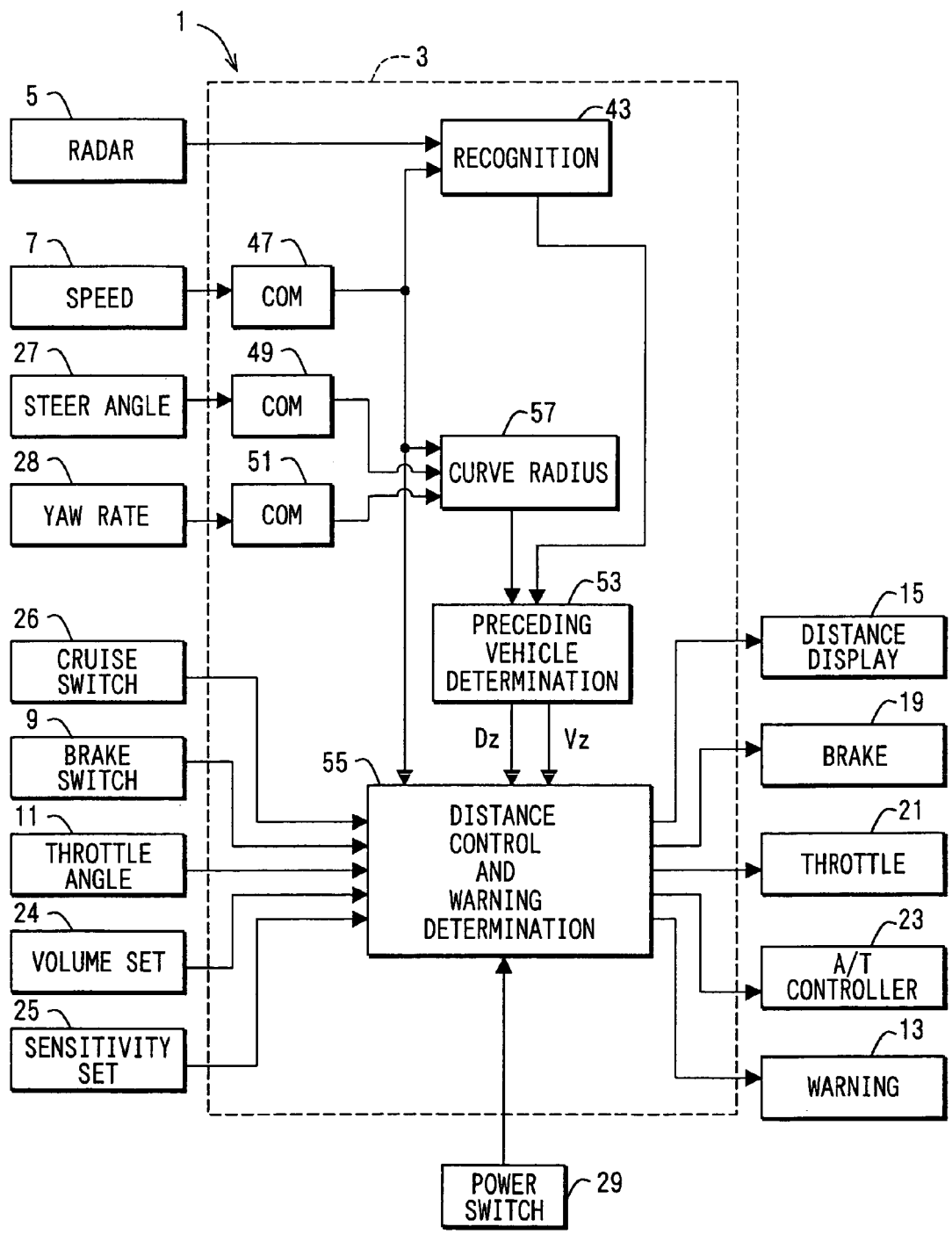
FIG. 1 is a block diagram showing a control apparatus provided by the present invention.

As shown in FIG. 1, a vehicle control apparatus 1 includes a recognition/inter-vehicle distance control ECU 3 as a core component. The control ECU 3 has a configuration mainly based on a microcomputer in addition to I/O (Input/Output) interfaces, a variety of driving circuits and a variety of detection circuits.

The control ECU 3 inputs a variety of detection signals from a laser radar sensor 5 serving as a vehicle radar apparatus, a vehicle speed sensor 7, a brake switch 9 and a throttle opening sensor 11. The control ECU 3 outputs a variety of driving signals to a warning-sound generator 13, a distance display unit 15, a brake driver 19, a throttle driver 21 and an automatic transmission controller 23. In addition, the control ECU 3 is also connected to a warning sound volume setter 24 for setting a warning sound volume, a warning sensitivity setter 25 for setting a sensitivity in a warning determination process, a cruise control switch 26, a steering angle sensor 27 for detecting the magnitude of an operation of a steering wheel not shown in the figure and a yaw rate sensor 28 for detecting a yaw rate generated in the vehicle. The control ECU 3 also includes a power supply switch 29, which is turned on to drive the control ECU 3 to start a predetermined process.

Figure 2A:
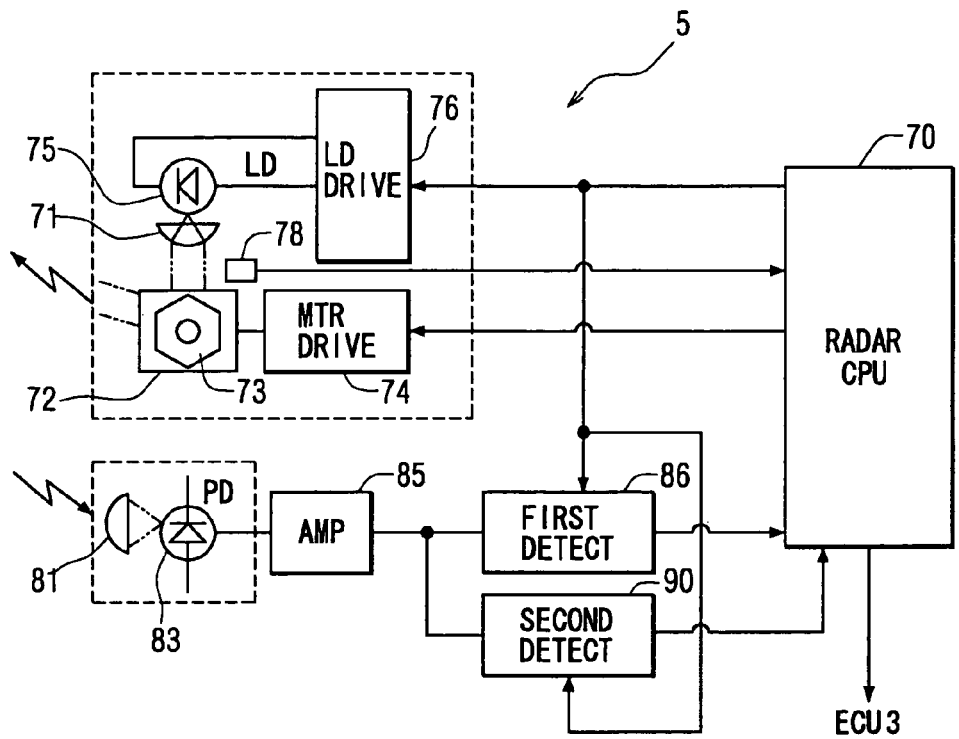
FIG. 2A is a block diagram showing a laser radar sensor employed in the control apparatus.

As shown in FIG. 2A, the laser radar sensor 5 includes main components such as a beam radiation unit, a beam reception unit and a laser radar CPU 70. The beam radiation unit has a semiconductor laser diode 75 for radiating a pulse-shaped laser beam by way of a light-emitting lens 71 and a scanner 72. The laser diode 75 is connected to the laser radar CPU 70 through a laser-diode drive circuit 76. An LD-driving signal output by the laser radar CPU 70 to the laser-diode drive circuit 76 drives the laser diode 75 to radiate a laser beam. The scanner 72 is connected to the laser radar CPU 70 through a motor-driving unit 74. The scanner 72 includes a polygon mirror 73, which is provided in such a way that the polygon mirror 73 can be rotated around a vertical axis. A motor-driving signal is output by the laser radar CPU 70 to the motor-driving unit 74 to rotate a motor for driving the polygon mirror 73. It is to be noted that the rotational position of the motor, which is not shown in the figure, is detected by a motor rotational position sensor 78 and passed on to the laser radar CPU 70.

Figure 3:
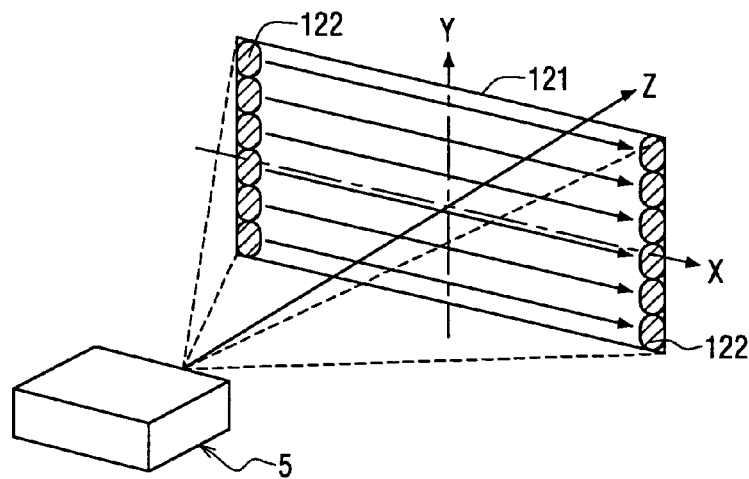
FIG. 3 is a schematic view showing a radiation area of the laser radar sensor.

Since the polygon mirror 73 has six mirrors having face fall (inclination) angles different from each other, a laser beam can be radiated in a scanning movement discontinuously within predetermined angular ranges for the transversal direction of the vehicle and the vertical direction as shown in FIG. 3. In this way, the laser beam is radiated in a two-dimensional scanning patterns 122. It is to be noted that the scanning patterns 122 of the laser beam only for cases in which the laser beam is radiated at the right and left edges of a detection area 121 of a beam-reflecting body such as a rear part of a vehicle. Patterns between the right and left edges are omitted.

As shown in FIG. 3, the laser beam is radiated in a movement of sequentially scanning an X-Y plane perpendicular to a Z-axis coinciding with the radiation direction. In this embodiment, a Y-axis coinciding with the vertical direction is taken as a reference direction and an X-axis coinciding with the transversal direction of the vehicle is taken as a scan direction. A scan area scanned by a laser beam in a two-dimensional scan operation has a typical scan range of ±18 deg (=0.08 deg/point×451 points) in the X-axis direction and a typical scan range of 4 deg (=0.7 deg/line×6 lines) in the Y-axis direction. However, the angular ranges of the scan area, the beam step angle and the number of beams are not limited to these typical numbers. Instead, they can each be set at any number.

In the scan area shown FIG. 3, the X-axis direction coinciding with the scanning direction is a direction from the left side to the right side whereas the Y-axis direction is a direction from the top to the bottom. Specifically, on the first scan line on the top of the Y-axis direction, the laser beam is radiated sequentially at intervals of 0.08 degrees spread in the X-axis direction. Similarly, on the second scan line right below the first scan line on the top of the Y-axis direction, the laser beam is then radiated sequentially at the same interval of 0.08 degrees spread in the X-axis direction. This scan operation is repeated in the same way for each of scan lines ending with the sixth scan line. That is, a plurality of laser beams is radiated for each of the scan lines ranging from the first scan line to the sixth scan line.

When laser beams are radiated to the scan area and reflected laser beams from the scan area of a beam-reflecting body such as a vehicle are received by the laser radar sensor 5, scan angles θx and θy representing radiation angles of each of the laser beams as well as a time difference between the radiation time of the laser beam and a reception time of a reflected beam of the laser beam are also obtained as well. This time difference represents the distance between the laser radar sensor 5 and the scan area of the beam-reflecting body. It is to be noted that the horizontal scan angle θx of a radiated laser beam is defined as an angle between a line projecting the radiated laser beam on the X-Z plane and the Z-axis. On the other hand, the vertical scan angle θy of a radiated laser beam is defined as an angle between a line projecting the radiated laser beam on the Y-Z plane and the Z-axis.

The beam reception unit of the laser radar sensor 5 has a condenser lens 81 for converging laser beams reflected by a beam-reflecting body not shown in the figure and a light reception device 83 or a photo diode 83 for outputting a voltage signal (or a received signal) representing the intensity of the converged reflected laser beams. The received signal output by the light reception device 83 is amplified by an amplifier 85 to produce a received signal having an amplitude at least greater than a predetermined value. Then, the received signal output by the amplifier 85 is supplied to a first detection circuit 86 and a second detection circuit 90. In the second detection circuit 90, a predetermined number of received signals are integrated. The configurations and operations of the first detection circuit 86 and the second detection circuit 90 are described below.

Figure 2B:
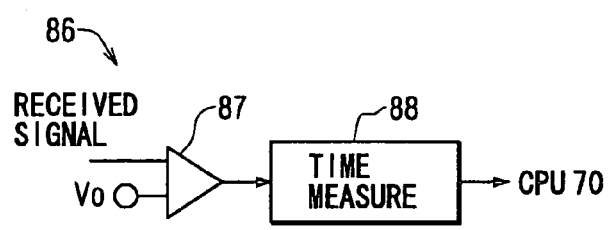
FIG. 2B is a circuit diagram showing a first detection circuit employed in the laser radar sensor and FIG. 2C is a circuit diagram showing a second detection circuit employed in the laser radar sensor.
Figure 4A:
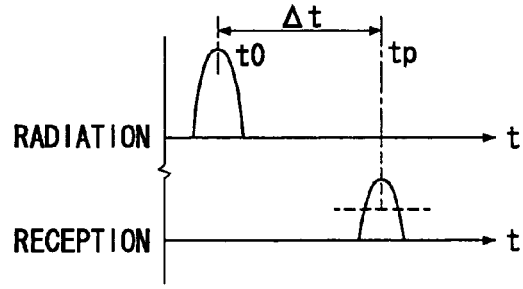
FIG. 4A is a signal diagram showing signal transmission and reception.

As shown in FIG. 2B, the first detection circuit 86 has a comparator 87 for comparing a received signal with a reference voltage V0 and a time measurement circuit 88 for measuring a difference between the radiation time of a laser beam and the reception time of a reflected beam represented by the received signal based on a comparison result generated by the comparator 87 as shown in FIG. 4A. This difference in time corresponds to a distance L between the laser radar sensor 5 and the beam-reflecting body.

As described above, the comparator 87 is a component for comparing a received signal received from the amplifier 85 with the reference voltage V0. When the received signal received from the amplifier 85 is higher than the reference voltage, the comparator 87 outputs a comparison signal, which is the received signal itself, to the time measurement circuit 88. On the basis of the comparison signal received from the comparator 87, the time measurement circuit 88 detects a rise time t11 or t21 and a fall time t12 or t22 shown in FIG. 4B. The rise time t11 or t21 is a point of time at which the received signal exceeds the reference voltage V0. On the other hand, the fall time t12 or t22 is a point of time at which the received signal falls to a level below the reference voltage V0. Then, the time measurement circuit 88 finds a peak-occurrence time tp based on the rise and fall times. The peak-occurrence time tp is a point of time a received signal reaches a peak value. It is to be noted that the reference voltage V0 is set at such a value that effects of noise components can be avoided.

Figure 4B:
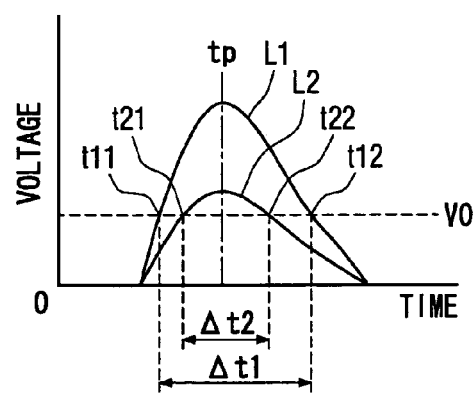
FIG. 4B is a graph showing waveforms used to find a peak-occurrence time of received signals.

FIG. 4B shows two received signals L1 and L2 corresponding to respectively two reflected signals with intensities different from each other. The curve L1 represents the received signal corresponding to the reflected signal with a relatively strong intensity. On the other hand, the curve L1 represents the received signal corresponding to the reflected signal with a relatively weak intensity. The received signals each representing the intensity of the reflected signal resulting in the received signal are each asymmetric with respect to a vertical line passing through the peak-occurrence time tp and, the larger the amplitude of the received signal, the higher the degree of asymmetry.

For this reason, for example, the time measurement circuit 88 finds time intervals Δt1 and Δt2. As shown in the figure, the time interval Δt1 is a difference between the rise time t11 and the fall time t12. On the other hand, the time interval Δt2 is a difference between the rise time t21 and the fall time t22. Then, the time measurement circuit 88 finds a peak-occurrence time tp based on the rise times t11 and t21 as well as the fall times t12 and t22 by taking the time intervals Δt1 and Δt2 into consideration.

The time interval Δt1 representing the difference between the rise time t11 and the fall time t12 can be regarded as the pulse width of the received signal corresponding to the reflected signal with a relatively strong intensity. Similarly, the time interval Δt2 representing the difference between the rise time t21 and the fall time t22 can be regarded as the pulse width of the received signal corresponding to the reflected signal with a relatively weak intensity. As is also obvious from FIG. 4B, the pulse width of the received signal corresponding to the reflected signal with a relatively strong intensity is greater than the pulse width of the received signal corresponding to the reflected signal with a relatively weak intensity. That is, the pulse width of a received signal corresponding to a reflected signal represents the intensity of the reflected signal.

To be more specific, the stronger the intensity of a reflected signal, the larger the pulse width of a received signal corresponding to the reflected signal. That is, the weaker the intensity of a reflected signal, the smaller the pulse width of a received signal corresponding to the reflected signal. Thus, the pulse width of a received signal corresponding to a reflected signal received by the laser radar sensor 5 is an indicator characterizing the intensity of the reflected signal.

After finding the peak-occurrence time tp of the voltage signal, a time difference Δt shown in FIG. 4A as the difference between an radiation time t0 of a laser beam resulting in the reflected signal and the peak-occurrence time tp is found. The time measurement circuit 88 is capable of determining the radiation time t0 of a laser beam resulting in the reflected signal from a driving signal received from the laser radar CPU 70 as a signal to drive the LD-driving circuit 76. The time difference Δt between the radiation time t0 of a laser beam resulting in the reflected signal and the peak-occurrence time tp is converted into a binary digital signal before being supplied to the laser radar CPU 70 along with the received-signal intensity data comprising the time interval Δt1 between the rise time t11 and the fall time t12 and the time interval Δt2 between the rise time t21 and the fall time t22.

Figure 2C:
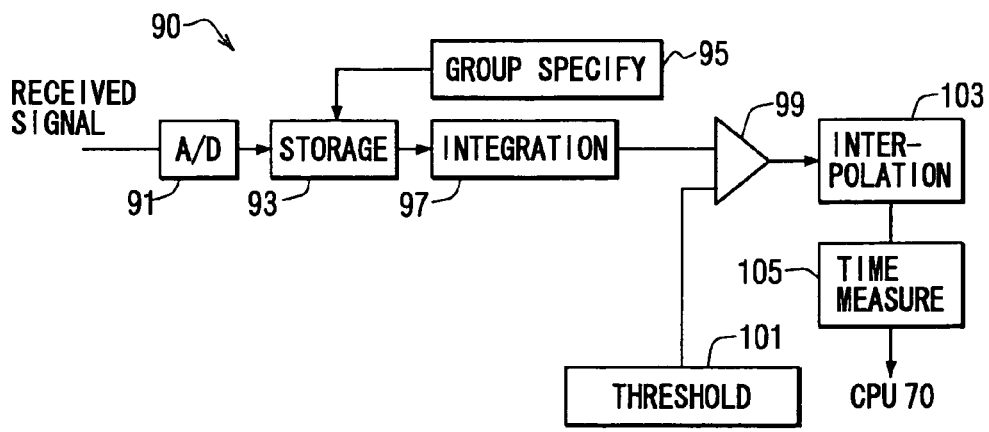
Figure 5:
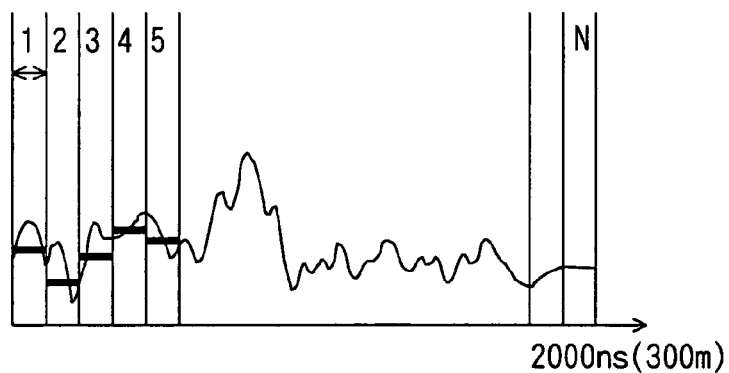
FIG. 5 is a signal diagram showing a waveform of received signals subjected to an A/D conversion circuit of a second detection circuit to convert an analog received signal into digital data.

The second detection circuit 90 is configured as shown in FIG. 2C. The second detection circuit 90 has an A/D (analog-to-digital) conversion circuit 91. An analog received signal from the amplifier 85 is supplied to the A/D conversion circuit 91 to be converted into digital data, which is then stored in a data storage circuit 93. It is to be noted that the analog received signal converted into digital data is a signal being output by the amplifier 85 during a predetermined period of typically 2,000 ns starting at the radiation time t0 of a laser beam. Then, as shown in FIG. 5, the A/D conversion circuit 91 divides the predetermined period of 2,000 ns into predetermined N segments each having a typical length of 25 ns and converts the average of magnitudes of the analog received signal supplied to the A/D conversion circuit 91 during each of the segments into a digital signal to be stored in the data storage circuit 93.

An integration-group specifying circuit 95 selects a predetermined number of digital signals for the same number of radiated laser beams spread adjacently in the X-axis direction among those stored in the data storage circuit 93, and supplies information indicating an integration group of the selected digital signals to the data storage circuit 93. Receiving the information, the data storage circuit 93 outputs the selected digital signals to the integration circuit 97 provided at a later stage as a component for integrating the digital signals. The integration group specified by the integration-group specifying circuit 95 as a group of the selected digital signals to be integrated by the integration circuit 97 is described by referring to FIGS. 6 to 8.

Figure 6:
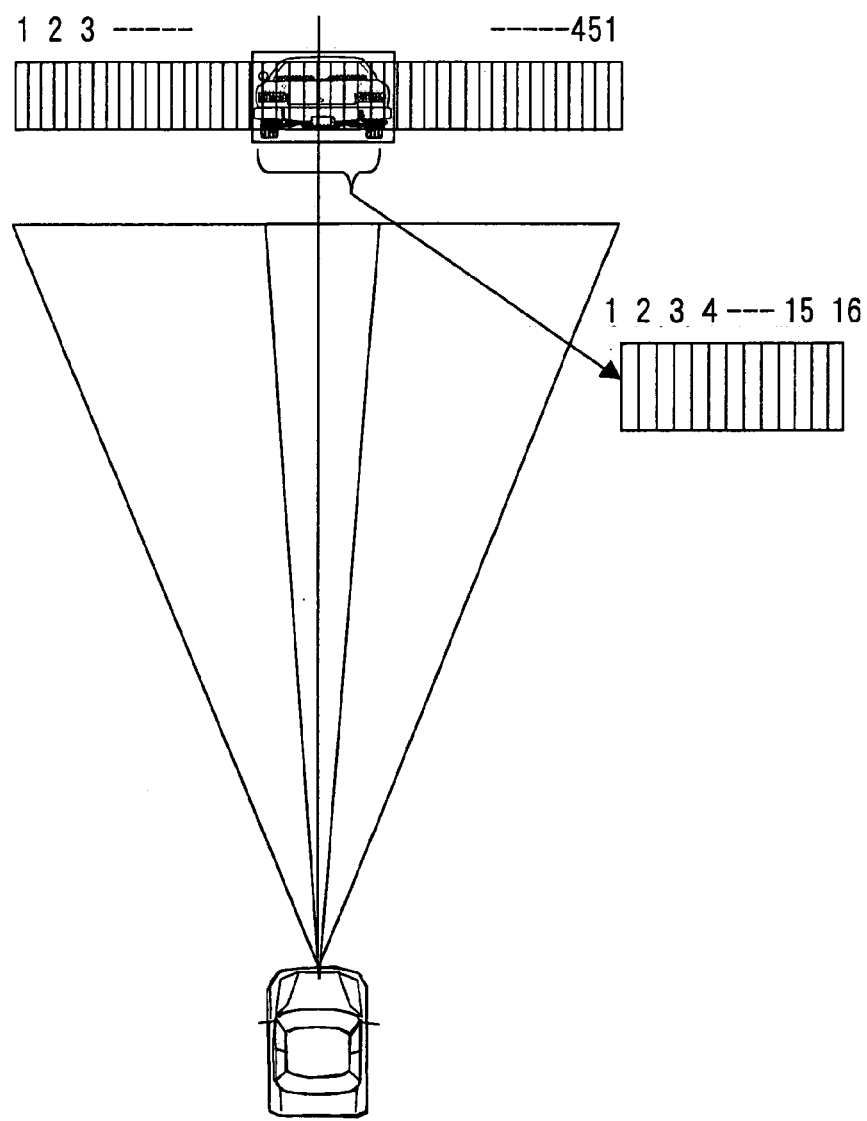
FIG. 6 is a schematic diagram showing a method to set a group including received signals to be integrated.

FIG. 6 shows a relation between a laser-beam radiation area and a preceding vehicle to be detected. It is to be noted that, for simplicity, a radiation area of only one scan line (X-axis direction in FIG. 3) is shown.

The preceding vehicle has reflectors each having a high reflectance against a laser beam on the rear face of the preceding vehicle. In addition, the body of the preceding vehicle also has a relatively high reflectance even though the reflectance of the vehicle body is not as high as the reflectance of the rear face. Thus, normally, a beam reflected by the preceding vehicle has a sufficiently high intensity so that a received signal representing the reflected beam has a magnitude exceeding the reference voltage V0 shown in FIG. 4B.

Figure 7:
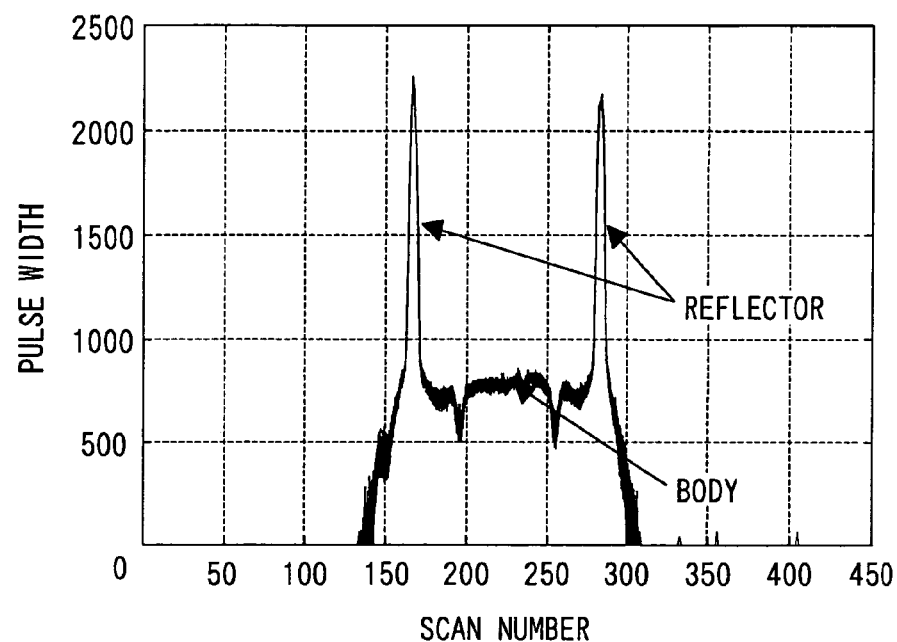
FIG. 7 is a graph showing a distribution of received-signal intensities over a rear face of a body of a preceding vehicle.

FIG. 7 shows a distribution of intensities of received signals each corresponding to a reflected signal coming from the rear portion of the preceding vehicle. That is, FIG. 7 shows a relation between the pulse width of each received signal and the scan numbers each indicating a reflected signal corresponding to the received signal. The pulse width of a received signal corresponding to a reflected signal coming from each of the two reflectors is very large, indicating that the intensity of the received signal is very high. On the other hand, the pulse width of a received signal corresponding to a reflected signal coming from the body of the preceding vehicle is about 40% of the pulse width of a received signal corresponding to a reflected signal coming from each of the two reflectors.

If dirt or snow covers the rear face of a preceding vehicle, however, the intensity of each beam reflected by the two reflectors and the body on the rear face decreases. Thus, it is very possible that even every received signal corresponding to a beam reflected by a reflector of the preceding vehicle is lower than the reference voltage V0. When every received signal corresponding to a beam reflected by a reflector of the preceding vehicle is lower than the reference voltage V0, the preceding vehicle cannot be detected based on the received signals. In particular, when the two reflectors cannot be detected, it is difficult to compute the width of the preceding vehicle.

In order to counter this difficulty, a plurality of received signals representing signals reflected by the preceding vehicle is integrated to amplify the received signals so that even received signals representing reflected signals each having a low intensity can be used for detecting the rear face of the vehicle body. Thus, even when dirt or snow covers the rear face of the preceding vehicle, reducing the reflectance exhibited by the rear face as a reflectance against a laser beam radiated thereto, the width of the preceding vehicle can still be found. Thus, it becomes possible to continuously recognize (or keep track of) the preceding vehicle based on the width.

The integration-group specifying circuit 95 specifies each integration group of received signals to be integrated. In the example shown in FIG. 6, the integration-group specifying circuit 95 sets the number of received signals included in each integration group as signals to be integrated at 16. However, the number of received signals can be set at any arbitrary value depending on factors such as the length of the detected body in the transversal direction of the vehicle, the upper limit of the distances of beam-reflecting bodies to be detected and the angular step over which a laser beam is shifted in the transversal direction of the vehicle.

In addition, the integration-group specifying circuit 95 newly specifies an integration group of 16 received signals to be integrated at intervals each equal to a period of time, in which the integration circuit 97 integrates 16 received signals of the present group. Then, a comparator 99 at the stage following the integration circuit 97 compares a result of the integration with a threshold value. Subsequently, an interpolation circuit 103 at the stage following the comparator 99 carries out a linear interpolation and, finally, a time measurement circuit 105 at the stage following the interpolation circuit 103 computes a time difference Δt.

Figure 8:
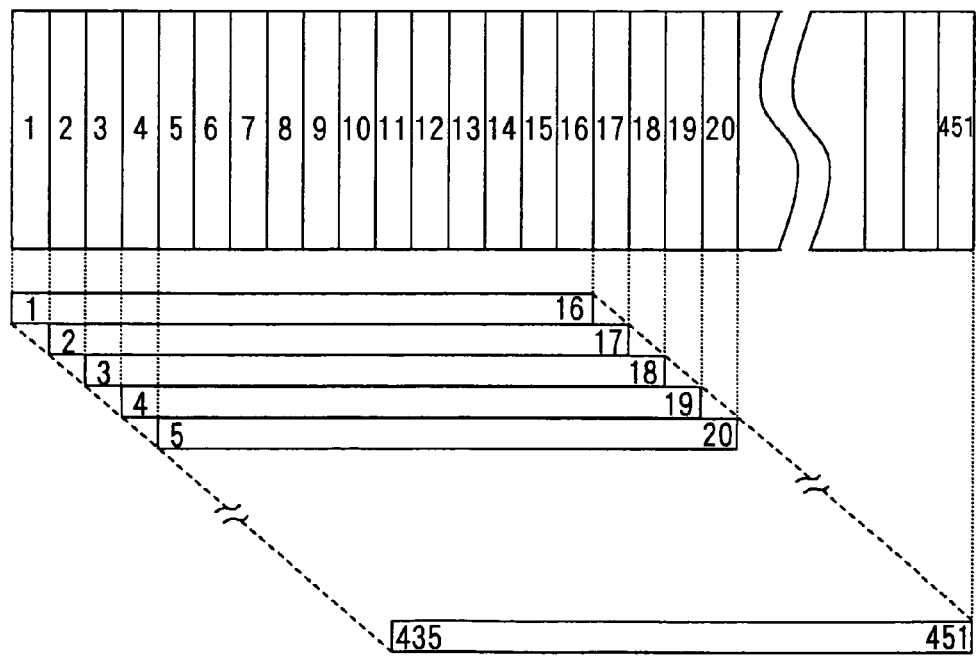
FIG. 8 is a schematic diagram showing a method adopted by an integration-group specifying circuit of the second detection circuit to shift the group including received signals to be integrated.

More specifically, assuming that numbers of 1 to 451 are assigned to 451 received signals respectively as shown in FIG. 8. The 451 received signals represent respectively 451 laser beams radiated in a scan operation from the left to the right in the X-axis direction. In this case, first of all, the integration-group specifying circuit 95 specifies a first integration group of 16 received signals identified by the numbers of 1 to 16 respectively as received signals to be integrated. Then, after the period of time corresponding to one interval described above lapses, the integration-group specifying circuit 95 newly specifies a second integration group of 16 received signals identified by the numbers of 2 to 17 respectively as received signals to be integrated. Thereafter, the integration-group specifying circuit 95 carries out the operation to specify an integration group of 16 received signals as received signals to be integrated by shifting the integration group by an interval corresponding to one received signal. In this way, while integrating 16 received signals, the second detection circuit 90 is capable of maintaining the detection resolution while suppressing reduction of resolution to a minimum.

Figure 9A:
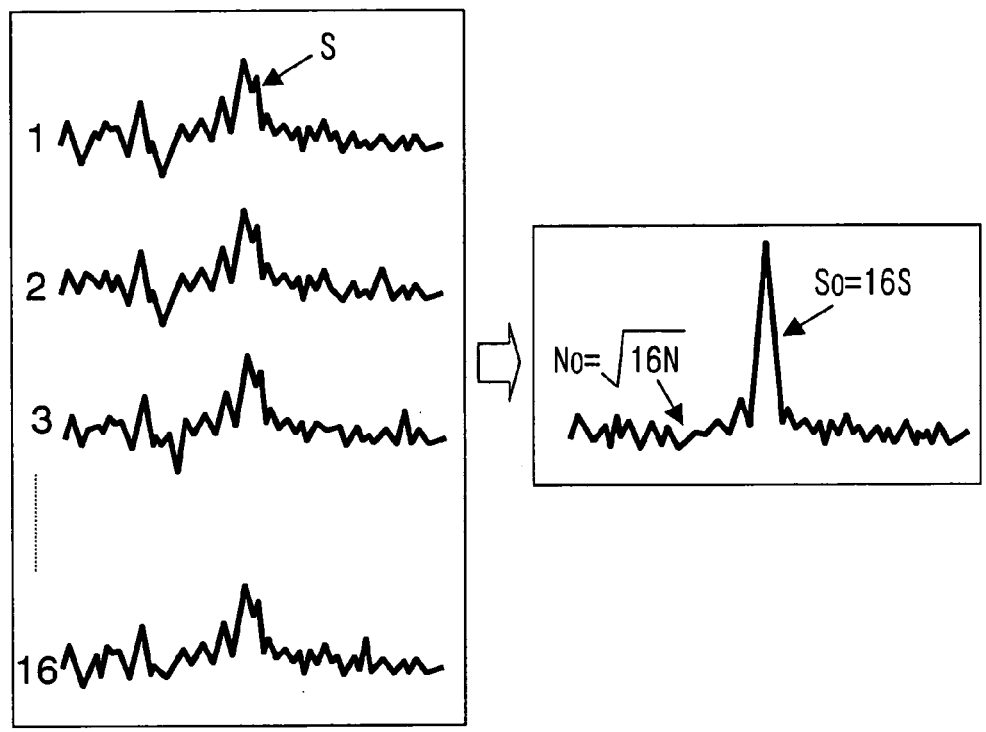
FIG. 9A is a schematic diagram showing integration of a plurality of received signals.

The 16 digital received signals pertaining to an integration group specified by the integration-group specifying circuit 95 are read out from the data storage circuit 93 and supplied to the integration circuit 97. As shown in FIG. 9A, the integration circuit 97 integrates the 16 digital received signals to generate an integrated received signal.

At that time, when all the 16 received signals include components S corresponding to signals reflected by the same beam-reflecting body, all the 16 received-signal components S are received by the laser radar sensor 5 at the same reception time at the end of the same period lapsing since the radiation time of the laser beams corresponding to the reflected signals. Thus, a received-signal component S0 of the integrated received signal is 16 times the received-signal component S of each received signal. That is, the received-signal component S0 of the integrated received signal is obtained such that the received-signal component S of a received signal is amplified at an amplification degree of 16.

Since noise components included in the received signals due to a variety of causes are basically generated at random, on the other hand, an amplitude resulting from the operation to integrate the 16 received signals as the resultant amplitude N0 of the noise components is only 4 ($=\sqrt{16}$) times the amplitude of each noise component. Thus, by integrating the 16 received signals in the integration circuit 97 into an integrated received signal, the S/N ratio of the received-signal components each representing a reflection signal reflected by a beam-reflecting body can be increased by an improvement factor of 4 times. The S/N ratio of the received-signal components is defined as a ratio of the amplitude S0 of the received-signal component of the integrated received signal to the amplitude N0 of the noise component of the integrated received signal. Thus, even when received-signal components S included in individual received signals each representing a signal reflected by a preceding vehicle are small and difficult to distinguish from noise components N, the rear-face portion of the body of the preceding vehicle can be detected by using the amplified received-signal component S0 of the integrated received signal obtained by integration of the received signals.

Figure 9B:
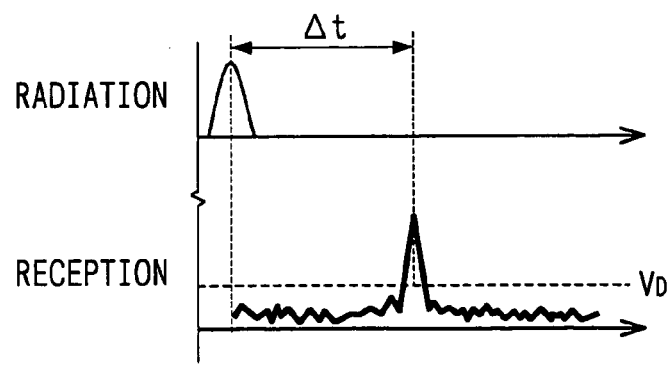
FIG. 9B is a signal diagram showing waveforms used to detecting a distance to a beam-reflecting body based on the integrated received signal.

As shown in FIG. 2C, the comparator 99 compares the integrated received signal obtained as a result of the integration with a threshold value VD (FIG. 9B) output by a threshold-value-setting circuit 101 as a voltage, which corresponds to the reference voltage V0 shown in FIG. 2B.

Figure 10:
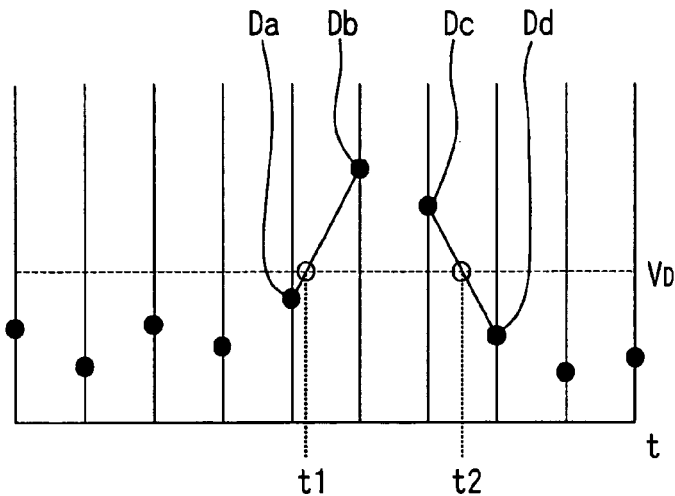
FIG. 10 is a signal diagram showing a waveform adopted by an interpolation circuit of the second detection circuit as a principle of linear interpolation.

More specifically, digital values computed discretely at predetermined time intervals as values of the integrated received signals are compared with the threshold value VD, which corresponds to the reference voltage V0 shown in FIG. 2B. Assuming that the digital values Db and Dc are greater than the threshold value VD as shown in FIG. 10. In this case, at those times, the comparator 99 outputs results of comparison to the interpolation circuit 103.

The interpolation circuit 103 finds the rise time t1 and the fall time t2 by a linear interpolation technique. The rise time t1 is defined as an estimated point of time at which the digital value exceeds the threshold value VD. On the other hand, the fall time is defined as an estimated point of time at which the digital value decreases to a level below the threshold value VD.

In accordance with the linear interpolation technique, a line connecting the digital value Db exceeding the threshold value VD to a digital value Da immediately preceding the digital value Db as a last value lower than the threshold value VD is assumed, and a point of time corresponding to an intersection of the assumed line and a horizontal line representing the threshold value VD is recognized as the rise time t1. Similarly, a line connecting the digital value Dc also exceeding the threshold value VD to a digital value Dd immediately succeeding the digital value Dc as a first value lower than the threshold value VD is assumed. In this case, a point of time corresponding to an intersection of the assumed line and a horizontal line representing the threshold value VD is recognized as the fall time t2.

The time measurement circuit 105 has the same configuration as the time measurement circuit 88 shown in FIG. 2B. In the same way as the time measurement circuit 88, the time measurement circuit 105 finds a peak-occurrence time based on the rise time t1 and the fall time t2. The peak-occurrence time is a point of time the received signal component S reaches a peak value. After finding the peak-occurrence time tp, a time difference $\Delta t$ shown in FIG. 9B as a difference between an radiation time t0 of a laser beam resulting in the reflected signal and the peak-occurrence time tp is found. The time measurement circuit 105 then supplies the time difference $\Delta t$ along with the received-signal intensity data comprising the rise time t1 and the fall time t2 to the laser radar CPU 70.

The laser radar CPU 70 computes a distance between the laser radar sensor 5 and the beam-reflecting body from the time differences $\Delta t$ received from the time measurement circuit 88 and the time measurement circuit 105, creating positional data based on the distance and the scan angles θx and θy. More specifically, based on the distance as well as the scan angles θx and θy, the laser radar CPU 70 computes the positional data of the beam-reflecting body in an X-Y-Z orthogonal coordinate system with the center of the laser radar 5 taken as the origin (0, 0, 0), the transversal direction of the vehicle taken as the X-axis, the vertical direction taken as the Y-axis and the forward direction of the vehicle taken as the Z-axis. Then, the laser radar CPU 70 supplies the positional data of the beam-reflecting body in the X-Y-Z orthogonal coordinate system to the control ECU 3 as measurement data.

It is to be noted that, in a process to create positional data based on an integrated received signal indicating the distance between the vehicle and a beam-reflecting body as well as the scan angles θx and θy, as the scan angle θx of a laser beam for the integrated received signal, the laser radar CPU 70 uses the scan angle θx of a laser beam at the center of a plurality of laser beams represented by received signals subjected to an integration process to produce the integrated received signal.

The control ECU 3 recognizes the beam-reflecting body based on the measurement data received from the laser radar sensor 5 and executes an inter-vehicle distance control for controlling the speed of the vehicle by outputting driving signals to the brake driver 19, the throttle driver 21 and the automatic transmission controller 23. In addition, when the beam-reflecting body is recognized as existing in a predetermined warning area for a predetermined period of time, for example, the control ECU 3 also carries out a warning determination process at the same time.

The internal configuration of the control ECU 3 is described briefly as a control block by referring to FIG. 1 as follows. The measurement data received from the laser radar sensor 5 as three-dimensional measurement data is supplied to a body recognition block 43. On the basis of the three-dimensional measurement data, the body recognition block 43 recognizes the preceding vehicle existing in front of the vehicle. Processing carried out by the body recognition block 43 to recognize a preceding vehicle is described below by referring to FIGS. 11 to 13. In this embodiment, the body recognition block 43 is provided in the control ECU 3. It is to be noted however that the body recognition block 43 can also be provided in the laser radar sensor 5.

Figure 11:
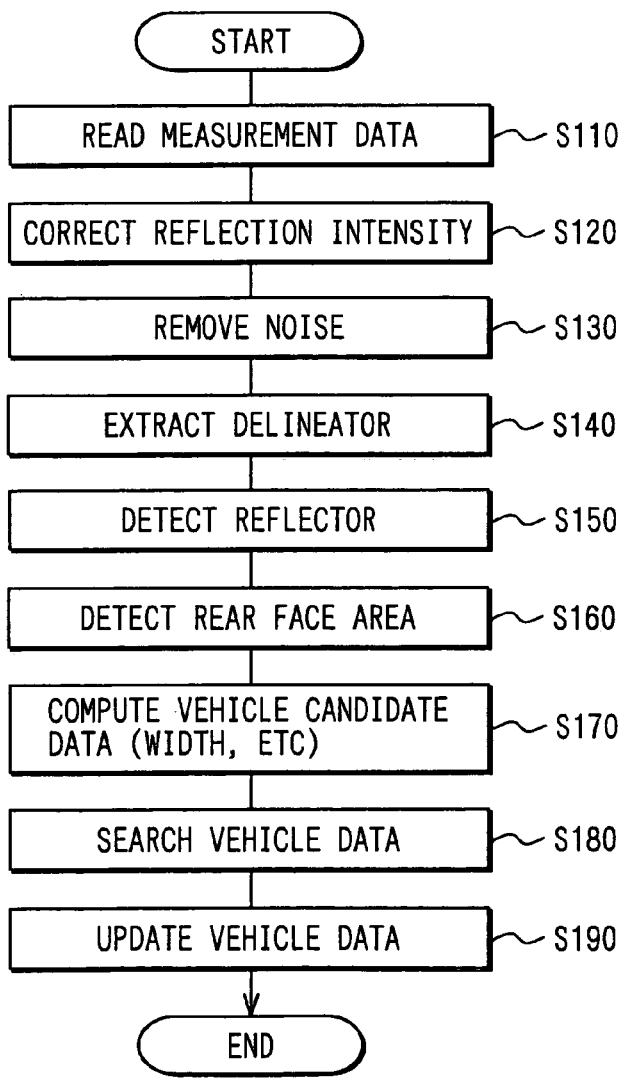
FIG. 11 is a flowchart representing processing to recognize a preceding vehicle.

FIG. 11 shows a flowchart representing the processing carried out by the body recognition block 43 to recognize a preceding vehicle. The processing starts with step S110 at which measurement data is input and read from the laser radar sensor 5. Data of intensities of received signals is included as part of the input measurement data. Then, at S120, the data of intensities of received signals is corrected. The data of intensities of received signals is corrected for the following reason. The laser radar sensor 5 faces the measurement area 121 shown in FIG. 3. Peripheral regions of the measurement area 121 have a tendency to reflect beams with a small light quantity in comparison with the center region. Thus, differences in light quantity between the peripheral regions and the center region need be reduced.

Then, at S130, the body recognition block 43 extracts some measurement data assumed to be noises from the input measurement data and removes the extracted noise measurement data. More specifically, a preceding vehicle existing in a detection distance range as a body to be recognized has a size to which a predetermined number of laser beams is radiated. When measurement data representing laser beams fewer than the predetermined number is obtained as data spatially separated from the rest, that is, when measurement data representing only two laser beams or fewer beams is obtained as data spatially separated from the rest, the measurement data obtained as data spatially separated from the rest may be regarded as noises generated by some causes. Measurement data regarded as noises is excluded from measurement data used in the subsequent processes to recognize a preceding vehicle.

Then, at S140, the body recognition block 43 extracts measurement data corresponding to delineators on road sides and excludes the extracted data. Delineators are defined as beam-reflecting things provided on road sides at predetermined intervals. In dependence on the traveling speed of the vehicle employing the control ECU 3, the delineators may be recognized as a body traveling at the same speed as that of the vehicle in some cases. From the intensities of received signals caused by the delineators, the size or each delineator and their speed relative to the vehicle, however, the delineators can be recognized separately from the vehicle.

Then, at S150, the body recognition block 43 detects reflectors of the preceding vehicle by using measurement data generated from individual received signals based on detection results generated by the first detection circuit 86. Since the two reflectors each have a reflectance higher than the body of the preceding vehicle as shown in FIG. 7, measurement data for the two reflectors can be extracted from the rest as data indicating received-light intensities higher than a threshold value set for the two reflectors.

In addition, since the two reflectors each have a reflectance much different from the body spread in the X-axis direction as the body of the preceding vehicle, by applying the same technique as edge extraction in image processing to execution of processing carried out on data of intensities of reflected signals, the measurement data for the two reflectors can also be extracted from the rest. By adoption of either technique, the measurement data for the two reflectors can be extracted from the rest. The measurement data for the two reflectors can be extracted from the rest by adoption of both the techniques.

After the measurement data for the two reflectors is extracted from the rest, at about the same distance from the vehicle, measurement data in a predetermined distance range spread in the transversal direction of the vehicle is put in a group in a grouping process. By carrying out this grouping process, portions for the pair of reflectors provided on the preceding vehicle can be identified. The grouping process is attained as follows.

Figure 12:
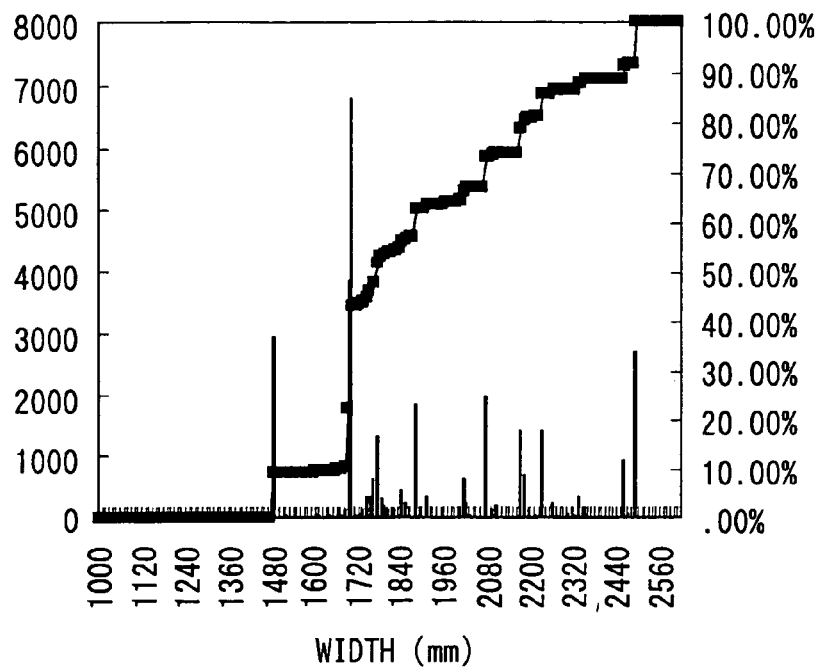
FIG. 12 is a graph showing a distribution of widths of vehicles having four wheels.

First of all, coordinates of the two reflectors are obtained from positional data included in the measurement data for the two reflectors. Then, based on the obtained coordinates of the two reflectors, reflectors separated from each other in the transversal direction by a distance equivalent to the width of the preceding vehicle are selected as reflectors located at about the same distance from the vehicle. The width of a vehicle is set in specifications of a vehicle. That is, in the case of a vehicle having four wheels, the width of a light small car is about 1.4 m, the width of a compact car is about 1.7 m, the width of a standard car is about 1.9 m and the width of a car with a large size is about 2.5 m even though the widths may vary to a certain degree in dependence on the type of the car. As a matter of fact, in accordance with a survey of distributions of vehicle widths for vehicles each having four wheels, almost all vehicles can be covered as vehicles having widths in the range 1.4 m to 2.5 m as shown in FIG. 12.

Figure 13:
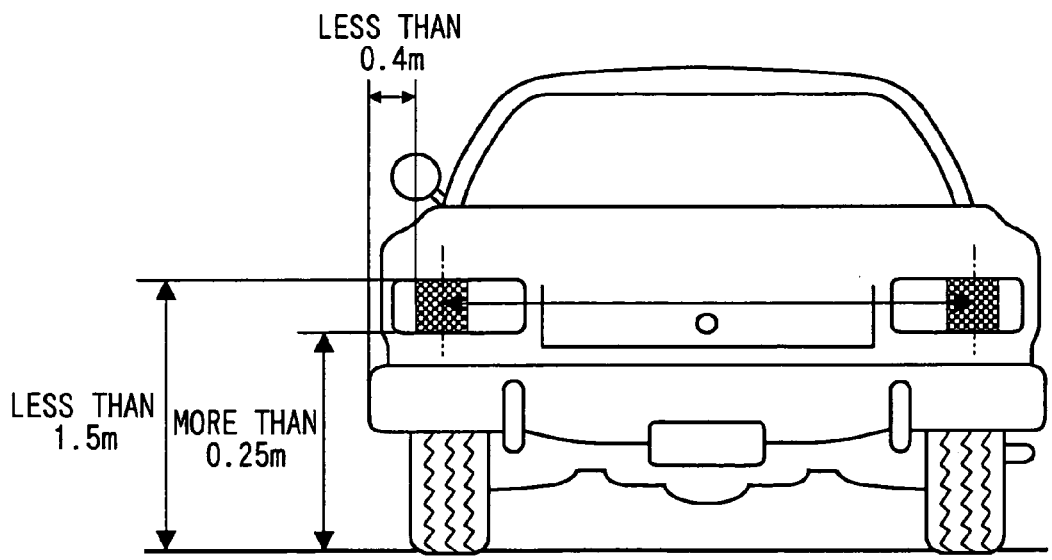
FIG. 13 is a rear view showing positions at which reflectors are installed on a body of a vehicle.
Figure 14:
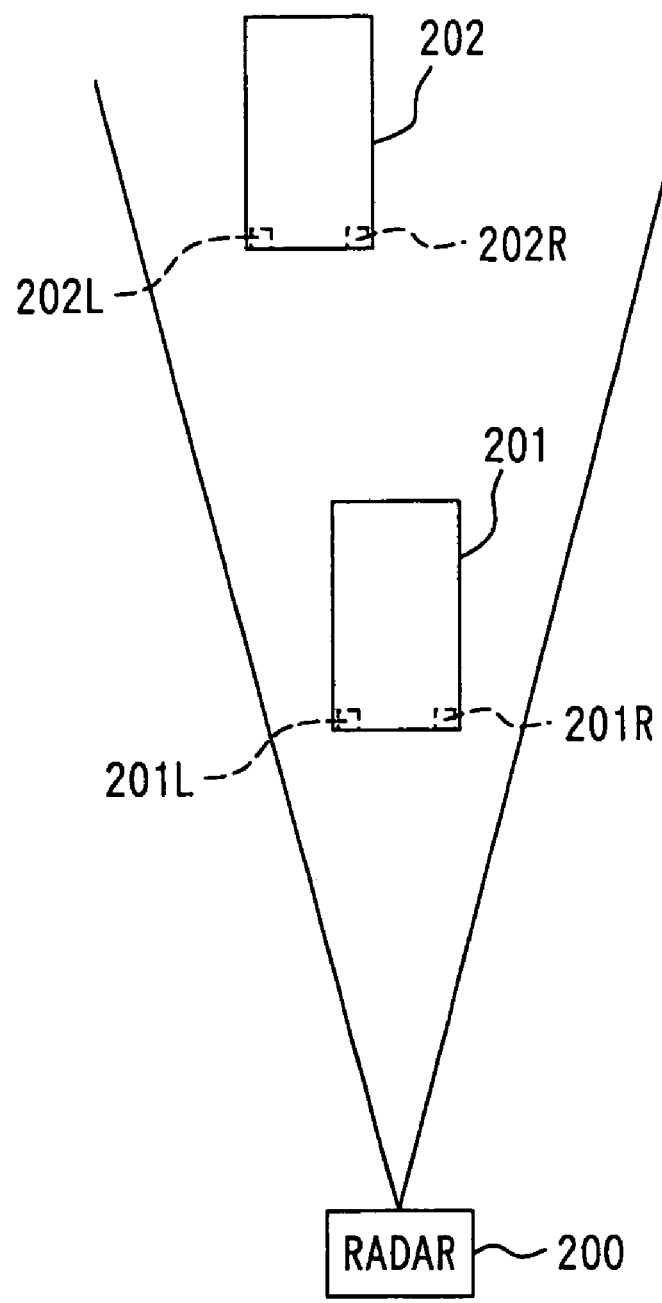
FIG. 14 is a schematic view showing typical traveling conditions of two preceding vehicles.

On the other hand, the left-side reflector is provided at a distance not exceeding 0.4 m from the left-side edge of the vehicle body as shown in FIG. 13. Similarly, the right-side reflector is provided at a distance not exceeding 0.4 m from the right-side edge of the vehicle body. Thus, taking the measurement precision of the laser radar sensor 5 into consideration, the range of vehicle widths can be set at the range 1.0 to 2.5 m.

It is to be noted that, due to reasons such as the fact that one of the two reflectors is dirty, the preceding vehicle is traveling along a curved road, one of the two reflectors is concealed behind an immediately preceding vehicle or the detected reflector is the reflector of a two-wheel motorcycle, the grouping process cannot be applied to measurement data for the two reflectors. In this case, the measurement data for the two reflectors is kept as it is.

Then, at S160, the body recognition block 43 detects the area of the rear face of the body composing the preceding vehicle by using measurement data received from the laser radar CPU 70 as data generated from integrated received signals each obtained as a result of a process carried out by the second detection circuit 90 to integrate a predetermined number of received signals. That is, by extracting measurement data having data of received-signal intensities exceeding a threshold value set for detection of the body of a vehicle from the measurement data generated from integrated received signals, measurement data for the area of the rear face of the vehicle body can be extracted. Afterwards, by grouping collections of measurement data revealing a size equivalent to the width of a vehicle, the coordinates indicating the position at which the area of the rear face of the body composing the preceding vehicle is located are detected. The measurement data for the area of the rear face of the body composing the preceding vehicle includes the width and height of the preceding vehicle.

Then, at S170, the body recognition block 43 computes data of a candidate for the preceding vehicle based on the pair of reflectors detected at S150 and the area detected at S160 as the area of the rear face of the body composing the preceding vehicle. When a pair of reflectors can be detected, the distance between the two reflectors and the position of the center between the two reflectors are used as data of a candidate for the preceding vehicle. Since the two reflectors each have a very high reflectance, by computing the distance between the two reflectors, the width of the preceding vehicle and the position of the center between the two reflectors can be found with a very high degree of precision.

It is to be noted that, in a process to find the width of the preceding vehicle from the distance between the two reflectors, the distance itself between the two reflectors can be used as the width of the preceding vehicle. In many cases, however, the two reflectors are provided at locations slightly shifted in the inward directions from the edges of the preceding vehicle to the center of the rear face. Thus, by adding predetermined offset values to the distance between the two reflectors, the width of the preceding vehicle can be found with a higher degree of accuracy. It is to be noted that the offset values can also be found from a frequency distribution on a most-likelihood basis. The frequency distribution is a distribution showing frequencies at which a distance between reflectors is shorter than the actual vehicle width by a difference for a large number of vehicles.

In addition, when a pair of reflectors can be detected, measurement data for the body rear face between the two reflectors is not used in a process such as determination of another beam-reflecting body. In addition, the center position between the two reflectors is used as center coordinates of data of a candidate for the preceding vehicle and the vehicle width computed from the distance between the two reflectors can be confirmed as the width of the preceding vehicle.

If either one of the two reflectors or both the reflectors cannot be detected, however, detection data obtained from integrated received signals as detection data of the area of the rear face of the vehicle body need be used in a process to compute the width of the preceding vehicle as data of a candidate for the preceding vehicle.

If only one of the two reflectors can be detected, the width of the preceding vehicle is computed by using data of a vehicle width for an area existing in the vicinity of the position of the undetected reflector as data of a vehicle width for the area of the rear face of the vehicle body. Since the two reflectors are provided at approximately the left and right edges of the preceding vehicle, the area of the rear face of the vehicle body exists at an offset from the undetected reflector on the left or right side. Thus, it is possible to determine whether the undetected reflector is the reflector on the left or right side and assume the position of the undetected reflector.

If measurement data obtained from integrated received signals is put in a group in a grouping process in order to find data of the width of the preceding vehicle, the precision of the positions of the left and right edges on the rear face of the preceding vehicle is poor in comparison with a case in which both the reflectors are used. It is thus preferable to attain redetection of the undetected reflector in the next scan operation and provide a determined tolerance range with regard to the edge position set from the data of the width of the preceding vehicle on the area of the rear face of the vehicle body. Specifically, the width of the vehicle is computed from a range to add and subtract a predetermined value to and from the position of a reflector and the position of an edge on the area of the rear face of the vehicle body. In this case, the position of the center in the data of a candidate for the preceding vehicle can also be set at a value having a predetermined range.

If the width of the preceding vehicle and center position of the data of a candidate for the preceding vehicle are computed by using the vehicle-width data for the area of the rear face of the vehicle in this way, the computed data is not confirmed uniquely. Instead, the computed data can have a tolerance range.

In addition, when both the reflectors cannot be detected, based on data of the width of the preceding vehicle and the height of the preceding vehicle, vehicle candidate data including the width of the preceding vehicle, the height of the preceding vehicle and the center position can be calculated. In this case, it is desirable to set a tolerance range for both end positions of the width of the preceding vehicle and the height of the preceding vehicle. When a tolerance range is set for both end positions of the width of the preceding vehicle, a range of values of the width of the preceding vehicle is wider than a case in which only one reflector is detected.

Then, at S180, vehicle data for the vehicle candidate data computed at S170 is examined in a search process to determine whether or not the vehicle data has been recognized and stored in a previous process. That is, assuming that the preceding vehicle has moved from the position included in the vehicle data found in a previous process at a relative speed in the previous process, the body recognition block 43 computes an estimated arrival position of the vehicle data as a position at which the preceding vehicle exists at the present time. With the computed estimated arrival position taken as a center, the body recognition block 43 then sets an area with a predetermined size as an estimated arrival range.

When at least part of the data of a candidate for the preceding vehicle is included in the estimated arrival range and the width of the preceding vehicle is a reasonable value, the examined vehicle data for the data of a candidate for the preceding vehicle is determined to be vehicle data already recognized and stored in a previous process. It is to be noted that, when the width of the preceding vehicle is found by using the coordinates of the area of the rear face of the vehicle body, the computed width of the preceding vehicle is not found as a unique value. Instead, the computed width of the preceding vehicle can have a tolerance range. Thus, the width of the preceding vehicle is regarded as an approximately reasonable value.

When the search process is executed to examine vehicle data for the data of a candidate for the preceding vehicle, the vehicle candidate data obtained at the current processing time has been computed from a specific one of the two reflectors and the vehicle-body rear-face area computed based on integrated received signals. However, when vehicle data for the vehicle candidate data obtained in processes prior to the previous process as data for the data of a candidate for the preceding vehicle has been computed from both the reflectors and stored in a memory, the side on which the undetected reflector is provided is estimated by combining the specific reflector with the vehicle-body rear-face area computed based on integrated received signals. Then, on the estimated side, the undetected reflector is assumed to exist at a position separated away from the specific reflector by a distance equal to vehicle width of the stored vehicle data and, in addition, the width and center position of the preceding vehicle are computed and used as vehicle data.

In special cases such as a case in which the preceding vehicle is traveling along a curved road or the rear face of the body of the preceding vehicle is partially concealed behind an obstruction, for example, only one of the two reflectors can probably be detected on a temporary basis. In such cases, when vehicle data including the width of the preceding vehicle has been computed from the distance between the two reflectors and stored in a memory in a previous process, based on the stored vehicle data, the width and position of the preceding vehicle can be computed with a high degree of accuracy in the current process. Thus, when both the reflectors of the preceding vehicle can be detected later, the probability that the preceding vehicle is regarded mistakenly as another vehicle can be reduced. That is, it is possible to keep track of the movement of the same preceding vehicle with a high degree of reliability.

Then, at S190, the body recognition block 43 updates the vehicle data based on a relation associating the stored vehicle data with data of the candidate for the preceding vehicle. The updated data includes the center position (X, Y and Z coordinates), the width of the preceding vehicle, the height of the preceding vehicle and the relative speed based on center-position changing with the lapse of time for each vehicle data. In order to compute the relative speed, the body recognition block 43 acquires the speed of the vehicle itself generated by the speed-processing block 47 based on a detection signal output by the vehicle-speed sensor 7.

It is to be noted that the width of the preceding vehicle is updated only when the vehicle width of the previous vehicle data has been computed by using coordinates of the area of the rear face of the body forming the preceding vehicle. When the width of the preceding vehicle has already been found from the distance between the two reflectors, the width is not updated. In addition, vehicle candidate data pertaining to no estimated arrival range and vehicle candidate data including an unreasonable width are handled as data of a preceding vehicle newly entering a detection area and stored tentatively in a memory. When such data of a candidate for the preceding vehicle is detected a predetermined number of times in a row, the data of the candidate for the preceding vehicle is confirmed as data of a preceding vehicle.

As described above, when a preceding vehicle is recognized in the body recognition block 43, data of the preceding vehicle is supplied to a preceding vehicle determination block 53. The preceding vehicle determination block 53 also receives a curvature radius from a curve-radius computation block 57. The curve-radius computation block 57 receives a steering angle computed by a steering-angle computation block 49 based on a signal output by the steering-angle sensor 27, a yaw rate computed by a yaw rate computation block 51 based on a signal output by the yaw rate sensor 28 and a vehicle speed generated by a speed computation block 47. The curve-radius computation block 57 then computes the curvature radius based on the steering angle, the yaw rate and the vehicle speed.

The preceding vehicle determination block 53 of the vehicle also determines which preceding vehicle is traveling along the same travel lane as the vehicle and separated from the vehicle by a shortest distance based on the curve radius and the center-position coordinates (X, Y, Z). Then, the preceding vehicle determination block 53 finds the distance in the Z-axis direction as a distance from the vehicle to the preceding vehicle and a relative velocity Vz of the preceding vehicle as a velocity relative to the vehicle.

Then, based on the distance Z between the vehicle and the preceding vehicle, the relative velocity Vz, the setting state of the cruise control switch 26, the operation state of the brake switch 9, information received from the throttle position sensor 11 as information on a position of a throttle and a sensitivity-setting value of the warning sensitivity setter 25, a block 55 comprising an inter-vehicle distance control unit and a warning determination unit determines whether or not a warning is to be issued in a warning determination process and determines the substance of vehicle-speed control in a cruise determination process. A result of the determination is output to the warning-sound generator 13 when a warning is required.

In the case of the cruise determination process, on the other hand, control signals are output to the automatic transmission controller 23, the brake driver 19 and the throttle driver 21 to execute required control. In addition, in the execution of the control, necessary display signals are output to the distance display unit 15 to inform the driver of conditions.

As described above, in this embodiment, the positions of two reflectors provided on a preceding vehicle are found based on individual received signals and the position of the rear face area of the body of the preceding vehicle is found on the basis integrated received signals each obtained as a result of integrating a plurality of received signals. Then, by using the positions of reflectors provided on a preceding vehicle and the position of the rear face area of the body of the preceding vehicle, the width of the preceding vehicle is computed.

The intensity of a signal reflected by the body of the preceding vehicle is weak in comparison with the intensity of a signal reflected by any of the two reflectors. As a result of integrating a plurality of received signals each representing a reflected signal, however, the intensity of a signal reflected by the body of the preceding vehicle can be amplified. Thus, by using integrated received signals, the position of the rear face area of the body of the preceding vehicle can be found with a relatively high degree of precision. Thus, when only one of the two reflectors can be detected or even when the two reflectors cannot be detected, the width of the preceding vehicle can be found. By using the width of the preceding vehicle, it is possible to keep track of the movement of the preceding vehicle and improve the recognizability of the preceding vehicle.

It is to be noted that the present invention is by no means limited to the embodiment described above. It is possible to implement a variety of modifications as follows.

(1) In the embodiment described above, by using the distance between the two reflectors and the positions of both edges of the rear face area of the body of the preceding vehicle, vehicle candidate data comprising the width of the preceding vehicle as well as the position of the center of the rear face area can be found. The vehicle candidate data can then be compared with already recognized data of a preceding vehicle to determine whether or not both pieces of vehicle candidate data are data of the same preceding vehicle.

In a process to compute data of a candidate for the preceding vehicle, however, the already recognized data of a preceding vehicle can be used as a reference. That is, based on the already recognized and stored data of a preceding vehicle, a range of arrival of the preceding vehicle in the current process can be estimated. When a plurality of reflectors and/or the area of a rear face of a body forming a preceding vehicle exists in the vicinity of the estimated arrival range, the vehicle width of the stored data of the preceding vehicle may be used to select a pair of reflectors or compute the vehicle width and vehicle height of the area of the rear face of the body forming the preceding vehicle.

That is, since reflectors are provided on both edges of the rear face of a body forming a preceding vehicle, the reflectors move in all directions with the distance between the reflectors remaining unchanged. Thus, when a pair of reflectors has been detected in a previous process and vehicle data having a confirmed vehicle width exists, an estimated arrival range in the current process is found. When a plurality of reflectors exist in the vicinity of the estimated arrival range, reflectors having the same distance between them as an already detected pair of reflectors are selected. Thus, an incorrect combination with a vehicle traveling in parallel to the preceding vehicle or a beam-reflecting body located on a side of a road can be avoided with a high degree of reliability.

In addition, even when a vehicle width (and others) of the data of a candidate for the preceding vehicle are computed by using the position of only one reflector and the coordinates of the area of the rear face of a body forming the preceding vehicle, the vehicle data recognized and stored in a previous process includes vehicle data corresponding to the data of a candidate for the preceding vehicle. When the vehicle data corresponding to the data of a candidate for the preceding vehicle includes a vehicle width computed from the distance of two reflectors, data of a candidate for the preceding vehicle can be computed by using the distance of the two reflectors as the width of vehicle and using the position of a middle point between the reflectors as the center position.

(2) In the embodiment described above, the laser radar sensor 5 of a vehicle has the first detection circuit 86 and the second detection circuit 90. The laser radar sensor 5 computes a period of time representing a distance from the vehicle to a preceding vehicle and data of intensities of received signals based on the individual received signals. In addition, after a plurality of received signals is integrated, the laser radar sensor 5 computes a period of time representing the distance from the vehicle to a preceding vehicle and data of intensities of received signals based on integrated received signals. However, the process to compute a period of time representing a distance from the vehicle to a preceding vehicle and data of intensities of received signals can also be entirely or partially implemented by software executed by the laser radar CPU 70 and/or the control ECU 3. In addition, in the embodiment described above, the laser radar sensor 5 internally transforms the distance and the associated scan angles θx and θy from quantities of a polar coordinate system into quantities of the X-Y-Z orthogonal coordinate system. However, the body recognition block 43 may also carry out the transformation process.

(3) In the embodiment described above, the integration-group specifying circuit 95 shifts the group of received signals to be integrated by an interval corresponding to a period of one received signal each time. However, the integration-group specifying circuit 95 may also shift the group of received signals to be integrated by an interval corresponding to a plurality of received signals fewer than received signals of the integration group at one time. Even in the latter case where at least received signals are grouped to form a plurality of groups each consisting a predetermined number of received signals, the detection resolution of the integrated received signals is improved over the case in which each of the received signals is used for detection.

(4) The embodiment described above integrates a plurality of received signals representing the same plurality of mutually adjacent laser beams radiated throughout a scan range spread over each scan line extended in the X-axis direction. However, the received signals to be integrated not only represent the mutually adjacent laser beams radiated throughout a scan range spread over each scan line extended in the X-axis direction, but may also represent mutually adjacent laser beams radiated throughout a scan range spread over each scan line extended in the Y-axis direction. In addition, the received signals to be integrated may also represent mutually adjacent laser beams radiated throughout scan ranges spread over a plurality of scan lines extended in the X-axis and Y-axis directions.

(5) The laser radar sensor 5 should not be limited to the disclosed type but may be any type as long as it is light detecting and ranging type (LIDAR).

What is claimed is:

1. A preceding vehicle recognition apparatus, comprising:
   a radar means for radiating a plurality of transmission signals over a predetermined angular range spread at least in a transversal direction of a vehicle and for outputting received signals each representing an intensity of a reflection signal reflected by a signal-reflecting body as a result of reflecting any one of the radiated transmission signals;
   a received-signal integration means for setting a plurality of received-signal integration groups each comprising a first predetermined number of received signals representing a predetermined number of adjacent transmission signals radiated by the radar means such that a preceding one of the received-signal integration groups is shifted to form a succeeding one of the received-signal integration groups by an interval corresponding to a second predetermined number of received signals fewer than the first predetermined number of received signals composing each of the received-signal integration groups so that some of the received signals pertain to adjacent preceding and succeeding received-signal integration groups overlapping each other and for integrating the first predetermined number of received signals composing each of the received-signal integration groups to find and output an integrated received signal for each of the received-signal integration groups;
   a reflector-position computation means for extracting the received signals each representing the intensity of a reflection signal reflected by reflectors mounted on a rear face of a preceding vehicle at least based on the intensities of the reflected signals and for finding positions of the reflectors based on the extracted received signals;
   a body rear-face area computation means for computing the area of a rear face of a body forming the preceding vehicle from the integrated received signals output by the received-signal integration means;
   a width computation means for computing a width of the preceding vehicle based on the positions of the reflectors and the area of the rear face of the body forming the preceding vehicle and for holding the computed width; and
   a preceding vehicle recognition means for continuously recognizing the preceding vehicle by identifying the preceding vehicle based on the width held by the width computation means as the width of the preceding vehicle.

2. The preceding vehicle recognition apparatus according to claim 1, wherein the width computation means finds a distance between the two reflectors from received signals representing the reflected signals, computes the width of the preceding vehicle from the distance between the two reflectors and stores the width of the preceding vehicle, when the radar means receives the reflected signals from the reflectors mounted on the rear face of the preceding vehicle.

3. The preceding vehicle recognition apparatus according to claim 2, wherein the width computation means computes the width of the preceding vehicle as a distance by adding offset values to the distance between the two reflectors.

4. The preceding vehicle recognition apparatus according to claim 1, wherein the width computation means computes the width of the preceding vehicle by combining the reflector position computed from the received signals representing the reflected signals received from a specific reflector as the position of the specific reflector and an area computed from the integrated received signals as the area of the rear face of the body forming the preceding vehicle, when the radar means receives reflected signals from only a specific reflector of a pair of reflectors mounted on the rear face of the preceding vehicle.

5. The preceding vehicle recognition apparatus according to claim 1, wherein the width computation means takes the stored width of the preceding vehicle as the width of the preceding vehicle as it is while estimating the position of the undetected reflector by combination of a reflector position computed from received signals representing the reflected signals received from a specific reflector as the position of the specific reflector and an area computed from the integrated received signals as the area of the rear face of the body forming the preceding vehicle, when the radar means receives reflected signals from only a specific reflector of a pair of reflectors mounted on the rear face of the preceding vehicle and the width computation means has computed the width of the preceding vehicle from the distance between the two reflectors and stored the width of the preceding vehicle.

6. The preceding vehicle recognition apparatus according to claim 1, wherein the width computation means computes the width of the preceding vehicle by using only an area computed from the integrated received signals as the area of the rear face of the body forming the preceding vehicle, when the radar means does not receive the reflected signals from a pair of reflectors mounted on the rear face of the preceding vehicle.

7. The preceding vehicle recognition apparatus according to claim 6, wherein:
   the radar means radiates a plurality of transmission signals over a predetermined angular range spread also in the height direction of the vehicle; and
   the width computation means computes the width and a height of the preceding vehicle based on the integrated received signals.

8. The preceding vehicle recognition apparatus according to claim 1, wherein the received-signal integration means sets the received-signal integration groups in a way such that a preceding one of the received-signal integration groups is shifted to form a succeeding one of the received-signal integration groups by an interval corresponding to one received signal.

* * * * *